UNITED STATES PATENT OFFICE.

HENRY LAMPARTER, JR., OF ST. CHARLES, MISSOURI.

PROCESS OF MAKING CORN-COB SMOKING-PIPES.

SPECIFICATION forming part of Letters Patent No. 448,572, dated March 17, 1891.

Application filed August 20, 1890. Serial No. 362,559. (No specimens.)

*To all whom it may concern:*

Be it known that I, HENRY LAMPARTER, Jr., a citizen of the United States, residing at St. Charles, county of St. Charles, and State of Missouri, have invented certain new and useful Improvements in the Manufacture of Corn-Cob Smoking-Pipes; and I do hereby declare that the following is a full, clear, and exact description of the invention, which will enable others skilled in the art to which it appertains to make and use the same.

I use the natural corn-cob, which I first cut into the desired shape for a pipe-bowl. Then I bore out the pith to within about one-half inch of the bottom. I then place it upon a turning-lathe and turn off the fuzz from the cob. I then sand-paper it off on the outside, then put it onto a spindle and give it a coating of alcohol, then revolve the cob on the spindle, and while it is revolving I press a very fine dust, which I manufacture out of the original corn-cob (the hard cob, not the pith or fuzz) into the interstices of the bowl until they are completely filled. I then give the bowl a coating of shellac on the outside.

The advantage of the pipe manufactured by me by the process described above is that it is a natural corn-cob pipe, the interstices of which are filled with the natural cob itself. The pipe thus manufactured, while it becomes more durable than the unfilled pipe, yet retains the color it has when manufactured (yellow) so long as the pipe lasts, and gives a sweet taste to the smoker, the corn-cob and also the filling absorbing the nicotine freely.

The pipe thus filled by me and covered with shellac has a much better appearance than the natural cob.

The composition used by me in the process of manufacturing these pipes is as follows: The solid corn-cob (excepting the pith and fuzz) is ground into a very fine dust or powder and applied either alone or in combination with corn-starch to the cob, which had been moistened with alcohol. When corn-cob dust and corn-starch are used in combination it is in the proportion of five parts of the powdered corn-cob to one part of corn-starch. The alcohol, whether used with the corn-cob powder alone or the combination of corn-cob powder and corn-starch, evaporates, leaving the filling either corn-starch dust pure and simple or corn-cob dust and corn-starch in above proportions.

Having hereinabove fully described my invention, and also fully described my composition, what I claim, and desire to secure by Letters Patent, is—

The process of manufacturing smoking-pipes out of the original and natural corn-cobs by cutting them into the desired shape and filling the interstices of the cob with finely-ground natural corn-cob, either pure or in combination with corn-starch, in the manner described, and coating the pipe thus filled with shellac, as described.

HENRY LAMPARTER, JR.

Witnesses:
O. J. MUDD,
WILL R. WHITE.